United States Patent
Shani et al.

(10) Patent No.: US 10,175,958 B2
(45) Date of Patent: Jan. 8, 2019

(54) ACQUIRING IDENTIFICATION OF AN APPLICATION LIFECYCLE MANAGEMENT ENTITY ASSOCIATED WITH SIMILAR CODE

(71) Applicant: Hewlett-Packard Development Company, L.P., Houston, TX (US)

(72) Inventors: Inbar Shani, Kibutz Beit Kama (IL); Yaron Burg, Yehud (IL); Amichai Nitsan, Rehovot (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 14/759,726

(22) PCT Filed: Jan. 30, 2013

(86) PCT No.: PCT/US2013/023740
§ 371 (c)(1),
(2) Date: Jul. 8, 2015

(87) PCT Pub. No.: WO2014/120139
PCT Pub. Date: Aug. 7, 2014

(65) Prior Publication Data
US 2015/0355888 A1    Dec. 10, 2015

(51) Int. Cl.
G06F 9/44    (2006.01)
G06F 8/36    (2018.01)
G06F 8/33    (2018.01)
G06F 8/71    (2018.01)
(Continued)

(52) U.S. Cl.
CPC .................. *G06F 8/36* (2013.01); *G06F 8/33* (2013.01); *G06F 8/71* (2013.01); *G06F 8/72* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| 6,701,514 B1 | 3/2004 | Haswell et al. |
| 7,437,614 B2 | 10/2008 | Haswell et al. |
| 2006/0136409 A1 | 6/2006 | Leidig |

(Continued)

FOREIGN PATENT DOCUMENTS

| CN | 101110021 A | 1/2008 |
| CN | 101329638 B | 12/2008 |

(Continued)

OTHER PUBLICATIONS

Altassian, "Know the History of Your Source," Fisheye, 50 pages, retrieved online on Jan. 8, 2013, available at http://www.atlassian.com/software/fisheye/overview/.

(Continued)

*Primary Examiner* — Qamrun Nahar

(57) ABSTRACT

Examples disclosed herein relate to acquiring identification of an application lifecycle management (ALM) entity associated with similar code. Examples include identifying a target code segment, and acquiring, from an ALM system, identification of an ALM entity associated with other code similar to the target code segment and identified by a code similarity system.

20 Claims, 4 Drawing Sheets

(51) Int. Cl.
*G06F 9/455* (2018.01)
*G06F 8/72* (2018.01)

(56) References Cited

U.S. PATENT DOCUMENTS

| | | | |
|---|---|---|---|
| 2007/0255843 A1 | 11/2007 | Zubev | |
| 2010/0011337 A1* | 1/2010 | Young | G06F 8/70 717/104 |
| 2012/0254823 A1 | 10/2012 | Coren et al. | |

FOREIGN PATENT DOCUMENTS

| | | |
|---|---|---|
| CN | 101699393 B | 4/2010 |
| CN | 102810057 B | 12/2012 |

OTHER PUBLICATIONS

Google Inc., "CodePro Analytix User Guide," excerpts, Mar. 27, 2012, 4 pages, available at https://developers.google.com/java-dev-tools/codepro/doc/>, <https://developers.google.com/java-dev-tools/codepro/html/what_is_sc>, <https://developers.google.com/java-dev-tools/codepro/doc/installation/updatesite_3.4.

Hewlett-Packard Development Company, L.P., "HP Application Lifecycle Management software," May 2012, Rev. 2, 8 pages, available at http://h20195.www2.hp.com/V2/GetPDF.aspx/4AA3-0927ENW.pdf.

Hovemeyer, et al., "Using the FindBugs(TM) Eclipse plugin," FindBugs(TM) Manual, Dec. 10, 2012, Chapter 7, 3 pages, available at http://findbugs.sourceforge.net/manual/eclipse.html#d0e16309.

International Search Report & Written Opinion received in PCT Application No. PCT/US2013/023740, dated Aug. 28, 2013, 9 pages.

Kersten, M., "Mylyn 2.0 Tutorial, Part 1: Integrated task management," Aug. 14, 2007, 17 pages, available at http://www.ibm.com/developerworks/library/j-mylyn1/.

Kersten, M., "Mylyn 2.0 Tutorial, Part 2: Automated context management," Aug. 14, 2007, 11 pages, retrieved from: <http://www.ibm.com/developerworks/java/library/j-mylyn2/>.

Li, H. et al., "Similar Code Detection and Elimination for Erlang Programs," (Research Paper), Proceedings of the 12th international conference on Practical Aspects of Declarative Languages, Mar. 17, 2010, pp. 104-118.

Microsoft, "Visual Studio Team Foundation Server 2012," retrieved Jan. 7, 2013, 11 pages, available at http://www.microsoft.com/visualstudio/eng/products/visual-studio-team-foundation-server-2012.

Sonarsource, S.A., "Application Lifecycle Management," (Web Page), Aug. 18, 2012, 3 pages, available at http://web.archive.org/web/20120818031933/http://www.sonarsource.com/products/features/application-lifecycle-management.

sonarsource.org, "Features," Sonar, retrieved online Jan. 8, 2013, 2 pages, available at http://www.sonarsource.org/features/.

sourceforge.net, "FindBugs(TM) Fact Sheet," Dec 10, 2012, 1 page, available at http://findbugs.sourceforge.net/factSheet.html.

Tasktop, "Compare Tasktop Products and Connectors," Feature Matrix, retrieved Jan. 8, 2013, 2 pages, available at http://tasktop.com/support/download/feature_matrix.php.

Tasktop, "Connect HP ALM and Quality Center with Eclipse," HP ALM & QC Connector, retrieved online Jan. 8, 2013, 4 pages, available at http://tasktop.com/connectors/hp-alm-quality-center.php.

Tasktop, "Connect your ALM stack & increase productivity," Tasktop Dev, retrieved online Jan. 8, 2013, 2 pages, available at http://tasktop.com/dev.

Tasktop, "Eclipse Mylyn Quick Reference Guide," Sep. 25, 2008, 3 pages, available at http://tasktop.com/pdfs/mylyn/quickref/mylyn3-quickref.pdf.

Wikipedia, "Duplicate code," Aug. 17, 2012, 5 pages, available at http://en.wikipedia.org/w/index.php?title=Duplicate_code&oldid=507785803.

Extended European Search Report received in PCT Application No. PCT/US2013/023740, dated Sep. 5, 2016, 8 pages.

Hou, D. et al., "CnP: Towards an Environment for the Proactive Management of Copy-and-Paste Programming," Program Comprehension, ICPC'09, IEEE 17th International Conference on, 2009, 6 pages, available at https://pdfs.semanticscholar.org/6cd5/e3959eb56a35e3a8e8edbf7f70e5d4ada9b0.pdf.

* cited by examiner

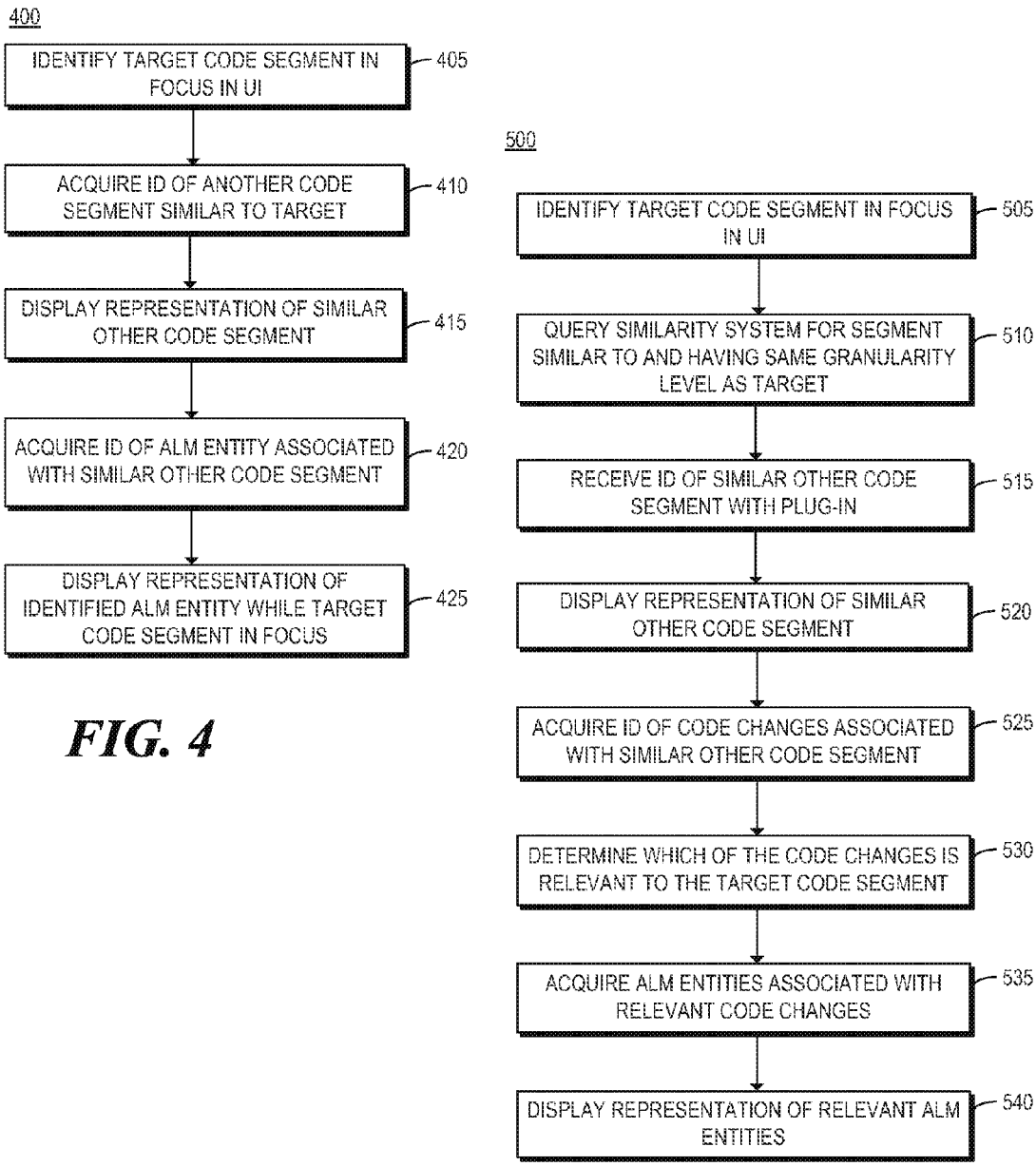

ACQUIRING IDENTIFICATION OF AN APPLICATION LIFECYCLE MANAGEMENT ENTITY ASSOCIATED WITH SIMILAR CODE

BACKGROUND

An organization that develops computer applications may utilize an application lifecycle management (ALM) system to assist developers in their task of writing and maintaining the source code (e.g., machine-readable instructions) of the applications. In some examples, an ALM system may provide a system for managing information associated with various aspects of the life of an application. For example, an ALM system may manage information about releases, defects, requirements, tests, and the like, associated with the applications.

BRIEF DESCRIPTION OF THE DRAWINGS

The following detailed description references the drawings, wherein:

FIG. 4 is a flowchart of an example method for acquiring identification of an ALM entity associated with similar code; and FIG. 5 is a flowchart of an example method for acquiring identification of an ALM entity associated with a code segment similar to and having the same granularity level as a target code segment.

DETAILED DESCRIPTION

As noted above, an application lifecycle management (ALM) system utilized by an organization may assist developers in their task of writing and maintaining application source code. In some examples, the ALM system may manage information in the form of ALM entities. As used herein, an "ALM entity" is a collection of information associated with an aspect of code development and maintained in an ALM system. In examples described herein, an ALM entity of an ALM system may include information regarding one of a defect, requirement, test, failure, developer, or the like, for example, or any other information relevant to application lifecycle management.

Additionally, other tools may allow developers to search the organization's code base for code similar to a portion of code being developed. However, such search tools fail to acquire any information from an ALM system regarding the code determined to be similar. As such, these tools fail to supplement the identification of similar code with insights into that code that may be provided by information available in an ALM system.

To address these issues, examples described herein may identify a target code segment, acquire identification of other code similar to the target code segment from a code similarity system, and acquire, from an ALM system, identification of an ALM entity associated with the similar other code. Such examples may identify an ALM entity representing a defect, requirement, test, failure, developer, or the like, associated with code determined to be similar to the target code segment.

In this manner, examples described herein may provide developers with valuable insights related to the target code being developed, which may improve developer productivity and code quality. Examples described herein may, for example, acquire identification of code similar to a target code segment being developed, and then acquire, from an ALM system, identification of an ALM entity describing a known defect associated with the similar code. In such examples, this information may assist the developer in writing the target code segment faster and possibly without the known defect.

Figure 1:
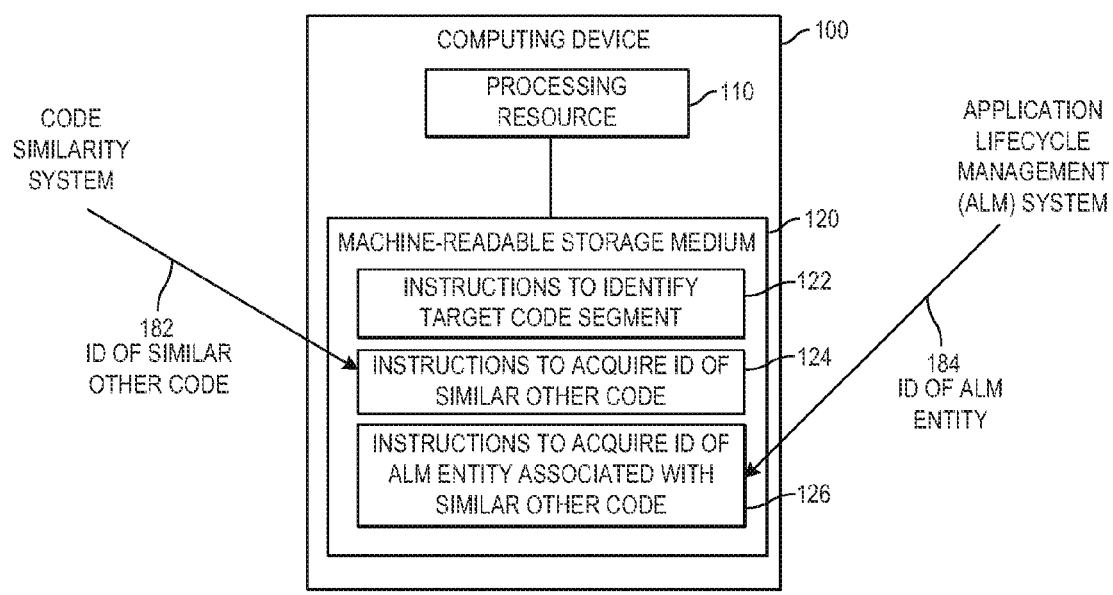
FIG. 1 is a block diagram of an example computing device to acquire identification of an application lifecycle management (ALM) entity associated with similar code.

Referring now to the drawings, FIG. 1 is a block diagram of an example computing device 100 to acquire identification of an ALM entity associated with similar code. As used herein, a "computing device" may be a desktop computer, notebook computer, workstation, tablet computer, mobile phone, smart device, server, or any other processing device or equipment. In the example of FIG. 1, computing device 100 includes a processing resource 110 and a machine-readable storage medium 120 encoded with instructions 122, 124, and 126. In some examples, storage medium 120 may include additional instructions. In some examples, instructions 122, 124, 120, and any other instructions described herein in relation to storage medium 120 may be stored on a machine-readable storage medium remote from but accessible to computing device 100 and processing resource 110.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

In the example of FIG. 1, instructions 122 may identify a target code segment. in some examples, instructions 122, 124, and 126 may be part of a plug-in for an integrated development environment (IDE) of computing device 100. In such examples, the IDE may include a user interface (UI) that may be displayed as part of a graphical user interface (GUI) of computing device 100. In such examples, instructions 122 may identify a code segment at least partially in focus in the UI of the IDE as the target code segment. In examples described herein, an IDE may be an application in which a user may develop software (e.g., machine readable instructions) and that includes at least the functionalities of a source code editor. In examples described herein, code "in focus" in the UI of an IDE at a given time may be code that is displayed in a source code editor portion of the UI at the given time.

In some examples, instructions 122 may identify, among all the code in focus in the UI, a portion of the code in focus. In such examples, instructions 122 may further identify, as the target code segment, a code segment of a given granularity level that includes the previously identified portion of code in focus in the UI.

In some examples, instructions 122 may identify the portion of code in focus based on user input, such as selection of any portion of the code in focus in any manner (e.g., highlighting, etc.). In other examples, instructions 122 may identify the portion of code in focus based on the current context of the IDE, or any other suitable information. For example, instructions 122 may derive the current context of the IDE based on the collection of information (e.g., files, etc.) currently active or open in the IDE.

As noted above, instructions 122 may further identify, as the target code segment, a code segment of a given granularity level that includes the identified portion of code in focus in the UI. For example, the granularity level may specify that the target code segment be a method, class, file, package, or the like. In some examples, the granularity level of the target code segment may be configurable. In examples described herein, a code "segment" may be any subdivision of source code, such as a method, class, file, package, or the like. In some examples, the target code segment may be only partially in focus when identified by instructions 122. For example, instructions 122 may identify a portion of a method that is partially in focus in the UI and subsequently identify the full method as the target code segment. Further, in examples described herein, a code segment that is at least partially in focus in the UI may be a code segment whose code is at least partially in focus in the UI.

In the example of FIG. 1, instructions 124 may acquire, from a code similarity system, identification 182 of other code similar to the target code segment. For example, instructions 124 may acquire identification 182 of one other code segment similar to the target code segment, or of a plurality of other code segments similar to the target code segment. In some examples, instructions 124 may query the code similarity system for code that is similar to the target code segment identified by instructions 122. In response, the code similarity system may return identification 182 of other code similar to the target code segment. In such examples, identification 182 may be received (or otherwise acquired) by instructions 124. In examples described herein, "other" code similar to a target code segment may be code that is similar to or the same as the target code segment, but that is not the target code segment itself. In some examples, other code similar to a target code segment may be a code segment that is similar to or the same as the target code segment, but that does not include any portion of the target code segment itself.

In some examples, the code similarity system may be any system to identify code that is similar to a target code segment among code present in east one code repository to which the system has access. In examples described herein, code "similar" to a target code segment may be code that is identical to the target code segment or code that is similar but not identical to the target code segment. In some examples, the code similarity system may determine whether given code is similar to a target code segment in any suitable manner.

For example, the code similarity system may determine whether the given code is similar to a target code segment based on the degree of similarity when comparing the given code and the target code segment directly (e.g., by comparing the characters, text, etc., of the code). In other examples, the code similarity system may determine the similarity based on the degree of similarity of more abstract representations of the given code and the target code segment. For example, the similar code system may derive abstract representations of the given code and the target code segment by a process similar to parsing the code during compilation. In other examples, the similar code system may derive abstract representations of the given code and the target code segment based on various functional aspects of the code, such as the inputs and outputs of the code, the methods or functions called by the code, the sequence of such calls, and the like, or any combination thereof. In some examples, the code similarity system may utilize any number of the methods described above, or any other suitable methods. In such examples, the code similarity system may determine that code is similar if any one of the methods used by the system indicates that the code is similar.

In some examples, the functionalities of the code similarity system may be implemented in the form of electronic circuitry, in the form of executable instructions encoded on a machine-readable storage medium, or a combination thereof. Additionally, in some examples, the code similarity system may be implemented on at least one computing device separate from but accessible to computing device 100, on computing device 100, or a combination thereof.

In the example of FIG. 1, instructions 126 may acquire, from an ALM system, identification 184 of at least one ALM entity associated with the similar other code. In some examples, instructions 126 may query the ALM system for ALM entities associated with the similar other code (e.g., similar other code segment(s)). In response, the ALM system may return, to instructions 126, identification 184 of at least one ALM entity associated with the similar other code.

The ALM system may store a plurality of ALM entities associated with code stored in at least one code repository (or "code base"). In some examples, the ALM entities may be associated with the code via code change descriptions, each of which may describe a change made to the code of a file in the code repository. In such examples, each of the code change descriptions may be linked to a code file in the repository, at least one line of code in the file, or both, and each of the ALM entities of the ALM system may be linked to one of the code change descriptions. In such examples, a given ALM entity of the ALM system may include information regarding one of a defect, requirement, test, failure, developer, or the like, associated with a given code change description, for example, In other examples, the given ALM entity may include any other information relevant to application lifecycle management and associated with the given code change description.

In such examples, instructions 126 may query the ALM system for any ALM entities associated with the similar other code and, in response, the ALM system may return, to instructions 126, identification 184 of at least one ALM entity associated with a code change description associated with the similar other code. For example, the ALM system may return each ALM entity associated with a code change description linked to a code file of the repository including at least a portion of one of the similar other code segment(s) identified by the code similarity system.

In other examples, instructions 126 may provide the ALM system with the similar other code or identification(s) of the similar other code. For example, instructions 126 may provide, to ALM system, the similar other code segment(s) (or identification thereof) in a query for code change descriptions. In response, the ALM system may return a representation of each code change description linked to a code file of the repository including at least a portion of one of the similar other code segment(s). In such examples, instructions 126 may determine which of the code change descriptions is relevant to the similar other code segment(s). In some examples, instructions 126 may query the ALM system for any ALM entities associated with the code change descriptions determined to he relevant. In response, the ALM system may return any ALM entities associated with the relevant code change descriptions.

In some examples, the functionalities of the ALM system may be implemented in the form of electronic circuitry, in the form of executable instructions encoded on a machine-readable storage medium, or a combination thereof. Additionally, in some examples, the ALM system may be implemented on at least one computing device separate from but accessible to computing device 100, on computing device 100, or a combination thereof.

Although the example of FIG. 1 has been described in the context of a UI of an IDE, examples described herein may be utilized in other contexts. For example, instructions 122, 124, and 126 may be part of a code check-in (or commit) system. In such examples, instructions 122 may identify the target code segment based on code changes checked into the system. In such examples, instructions 124 may acquire identification of other code similar to the identified target code segment, and instructions 126 may acquire identification an ALM entity associated with the similar other code, as described above.

In some examples, instructions 122, 124, and 126 may be part of an installation package that, when installed, may be executed by processing resource 110 to implement the functionalities described herein in relation to instructions 122, 124, and 126. In such examples, storage medium 120 may be a portable medium, such as a CD, DVD, or flash drive, or a memory maintained by a server from which the installation package can be downloaded and installed. In other examples, instructions 122, 124, and 126 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-5.

Figure 2:
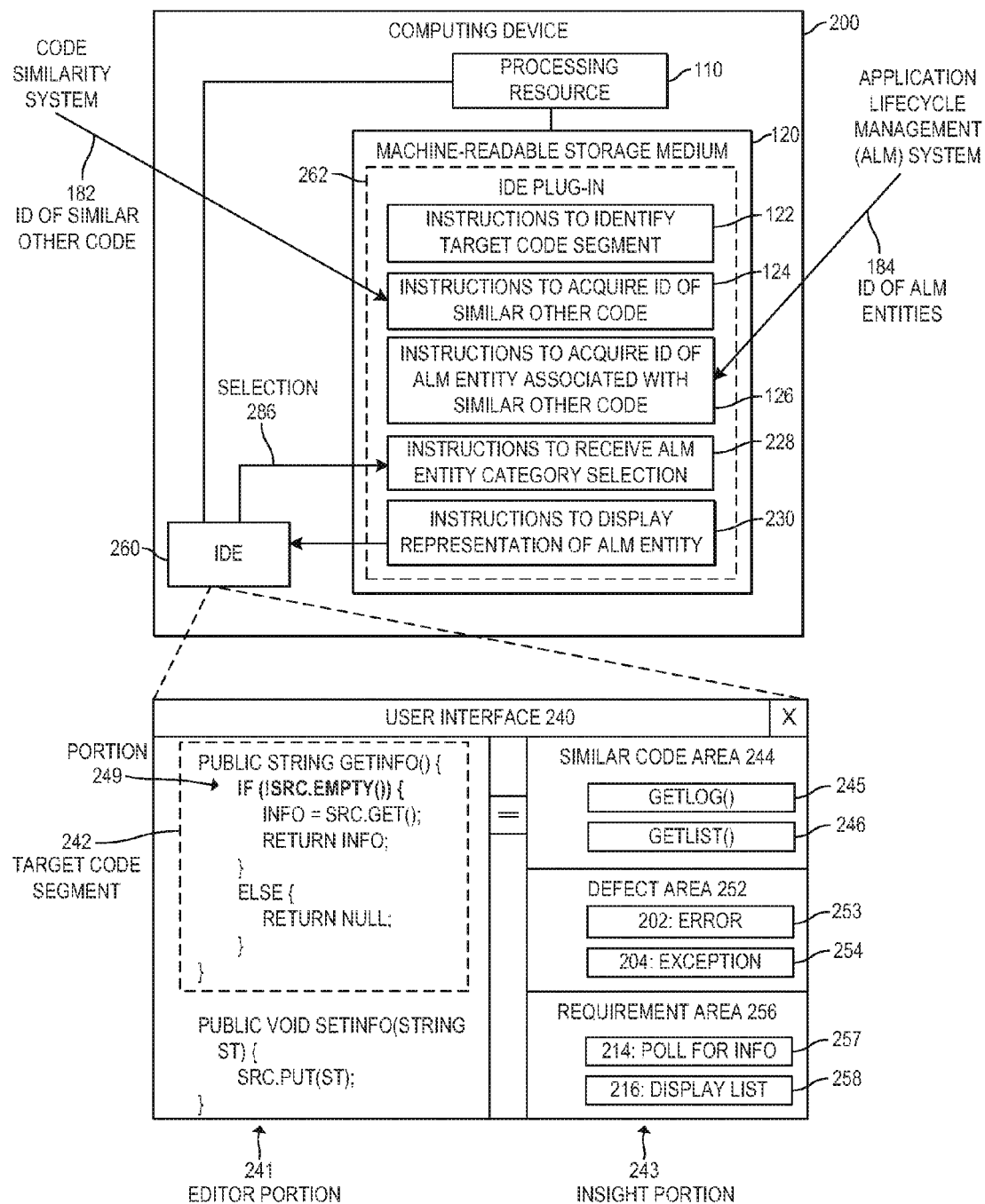
FIG. 2 is a block diagram of an example computing device to display a representation of an identified ALM entity.

FIG. 2 is a block diagram of an example computing device 200 to display a representation of an identified ALM entity. In the example of FIG. 2, computing device 200 includes a processing resource 110, as described above in relation to FIG. 1, and a storage medium 120 including instructions 122, 124, and 126, as described above in relation to FIG. 1. In the example of FIG, 2, storage medium 120 may also include instructions 228 and 230. In some examples, storage medium 120 may include additional instructions. In other examples, instructions 122, 124, 126, 228, 230 and any other instructions described herein in relation to storage medium 120 may be stored on a machine-readable storage medium remote from but accessible to computing device 200 and processing resource 110.

Computing device 200 also includes an IDE 260. In some examples, the functionalities of IDE 260 may be implemented in the form of electronic circuitry, in the form of executable instructions encoded on a machine-readable storage medium, or a combination thereof. In such examples, processing resource 110 may fetch, decode, and execute any instructions of IDE 260 to perform functionalities of IDE 260. In some examples, at least some of any instructions of IDE 260 may be stored on storage medium 120. In other examples, any instructions of IDE 260 may be stored on a machine-readable storage medium remote from but accessible to computing device 200 and processing resource 110.

In the example of FIG. 2, at least some of the instructions stored on storage medium 120 may implement a plug-in 262 for IDE 260. In such examples, plug-in 262 may supplement IDE 260 with additional functionalities that may not be otherwise provided by IDE 260. Instructions implementing plug-in 262 may include at least instructions 122, 124, 126, 228, and 230. In some examples, instructions 122, 124, 126, 228, and 230 may be part of a larger set of instructions (e.g., stored on storage medium 120) implementing plug-in 262.

In the example of FIG. 2, IDE 260, together with plug-in 262, may display a user interface (UI) 240, on a display of (or in communication with) computing device 200. For example, IDE 260 may display portion(s) of UI 240 (e.g., a source code editor portion 241), while plug-in 262 displays other portion(s) of UI 240 (e.g., an insight portion 243). In other examples. IDE 260 may display UI 240, while receiving input from display engine 330. In such examples, input from plug-in 262 may affect what IDE 260 displays in UI 240. For example, plug-in 262 may cause IDE 260 to display insight portion 243 as part of UI 240 displayed by IDE 260.

IDE 260 may be any suitable integrated development environment. In some examples, IDE 260 may include at least the functionalities of a source code editor and may display UI 240 as part of a GUI of an operating system (OS) of computing device 200. In the example of FIG. 2, source code editor portion 241 of UI 240 may display code of a file that is open in IDE 260 and may allow user interaction to at least view and edit the code of the open file. In some examples, a user may also initiate any other functionality of an IDE (e.g., code compilation, etc.) via UI 240.

In the example of FIG. 2, instructions 122 may identify a code segment at least partially in focus in UI 240 of IDE 260 as a target code segment 242. In some examples, instructions 122 may identify a portion of the code in focus in editor portion 241, and identify, as target code segment 242, a code segment of a given granularity level that includes the identified portion of code in focus, as described above in relation to FIG. 1. In such examples, the given granularity level may be set for use by various function(s) of plug-in 262. In some examples, the given granularity level may be a method level, a class level, a file level, a package level, or any other suitable segment of code.

In the example illustrated in FIG. 2, instructions 122 may identify a portion 249 of code in focus in editor portion 241 of UI 240, in response to user input, the current context of the IDE, or any other suitable information, as described above in relation to FIG. 1. In the example of FIG. 2, the given granularity level may specify a method level granularity. In such examples, after instructions 122 identify the portion 249 that is in focus, instructions 122 may identify, as target code segment 242, the full code of method "GetInfo( )", which is the method that includes portion 249. In other examples, the given granularity level may specify a different level. In such examples, instructions 122 may identify a target code segment 242 of a different granularity. For example, instructions 122 may identify a class including the identified portion 249 as target code segment 242 if a class level granularity is specified, may identify a file including the identified portion 249 as target code segment 242 if a file level granularity is specified, etc.

Instructions 124 may acquire, from a code similarity system, identification 182 of other code similar to target code segment 242, as described above in relation to FIG. 1. For example, instructions 124 may acquire, from the code similarity system, identification 182 of one other code segment or a plurality of other code segments similar to target code segment 242. In some examples, instructions 230 may display, in UI 240, at least one representation of similar other code identified by the code similarity system while target code segment 242 is at least partially in focus in UI 240. For example, instructions 230 may display, in UI 240, representation(s) of similar other code segment(s) identified by the code similarity system while target code segment 242 is at least partially in focus in UI 240.

In the example of FIG. 2, instructions 124 may acquire identification 182 of similar other code segment(s) of the same granularity as target code segment 242. For example, when the granularity of target code segment 242 is a method level granularity, instructions 124 may acquire identification of other methods similar to target code segment 242 from the code similarity system. In such examples, instructions 230 may display representations of the other similar methods in UI 240.

For example, as illustrated in FIG. 2, instructions 124 may acquire, from the code similarity system, identification 182 of other methods similar to target code segment 242 ("GetInfo( )"), such as methods "GetLog( )" and "GetList( )". In such examples, instructions 230 may display representations 245 and 246 of methods "GetLog( )" and "GetList( )" in an insight portion 243 of UI 240, while target code segment 242 is at least partially in focus in UI 240.

In examples described herein, instructions 230 may display any suitable representation of similar other code (e.g., similar other code segment(s)). For example, each representation may each include at least one identifier associated with the similar other code. In the example of FIG. 2, each displayed ALM representation includes an identifier (e.g., "GetLog( )", "GetList( )") associated with the represented similar other code (e.g., similar other method).

Instructions 126 may acquire, from an ALM system, identification 184 of an ALM entity associated with the identified similar other code, as described above in relation to FIG. 1. In some examples, instructions 230 may display, in UI 240, a representation of the identified ALM entity associated with the similar other code while target code segment 242 is at least partially in focus in UI 240. For example, instructions 230 may display a representation 253 of an ALM entity associated with the similar other code in an insight portion 243 of UI 240, while target code segment 242 is at least partially in focus in editor portion 241 of UI 240, as illustrated in FIG. 2.

In some examples, instructions 126 may acquire, from the ALM system, identification 184 of each of a plurality of ALM entities associated with the similar other code. In such examples, instructions 230 may display, for each of at least some of the plurality of ALM entities, a representation of the ALM entity in UI 240 while target code segment 242 is at least partially in focus in UI 240. In such examples, instructions 230 may display respective representations of each of the identified ALM entities, or of less than all of the ALM entities identified by the ALM system.

As described above, instructions 124 may acquire identification 182 of similar other code segments (i.e., methods) "GetLog( )" and "GetList( )", for example. In such examples, instructions 126 may acquire, from the ALM system, identification 184 of at least one ALM entity associated with each of at least one of the similar code segments. For example, instructions 126 may acquire, from the ALM system, identification 184 of a plurality of ALM entities, including ALM entities associated with "GetLog( )" and ALM entities associated with "GetList( )". In such examples, instructions 230 may display a representation of each of the identified ALM entities. For example, as illustrated in FIG. 2, instructions 230 may display representations 253 and 257 of the ALM entities associated with "GetLog( )" and representations 254 and 258 of the ALM entities associated with "GetList( )". In such examples, instructions 230 may display the representations of the ALM entities in insight portion 243 of UI 240 while target code segment 242 is at least partially in focus in editor portion 241 of UI 240. The plurality of ALM entities may include any number of ALM entities. In some examples, the identified plurality of ALM entities may include additional ALM entities which instructions 230 do not display. In other examples, instructions 230 may display additional ALM entities.

In examples described herein, instructions 230 may display any suitable representation of an identified ALM entity. For example, the displayed ALM entity representations may each include at least one identifier associated with the ALM entity. In the example of FIG. 2, each of the displayed ALM entity representations includes a numerical identifier associated with the ALM entity (e.g., "202") and a text description of the ALM entity (e.g., "ERROR"). In the example of FIG. 2, the displayed representations include a representation 253 of an ALM entity describing a defect associated with "GetLog( )", a representation 257 of an ALM entity describing a requirement associated with "GetLog( )", a representation 254 of an ALM entity describing a defect associated with "GetList( )", and a representation 258 of an ALM entity describing a requirement associated with "GetList( )".

In some examples, in response to a launch operation performed on a displayed representation of an ALM entity, instructions 230 may launch an ALM entity viewer to display ALM information associated with the ALM entity. In such examples, the ALM entity viewer may be a functionality of IDE 260 by which IDE 260 may retrieve ALM information associated with the ALM entity, and display the ALM information in UI 240.

In the example of FIG. 2, instructions 228 may receive a selection 286 of at least one of a plurality of ALM entity categories. In such examples, instructions 230 may display a representation of each of the plurality of identified ALM entities belonging to any selected category of ALM entities. In some examples, instructions 228 may receive selection 286 via any suitable control (e.g., menu, button(s), etc.) of UI 240 of IDE 260. In other examples, selection 286 may be received in any other suitable manner. The plurality of ALM entity categories may include, for example, at least one of a defects category, a requirements category, a tests category, a build failures category, a developers category, and any other suitable category of ALM entities. In other examples, the plurality of ALM entity categories may include multiple categories corresponding to one of the previously listed categories. For example, rather than a single test category, the plurality may include at least one of a unit tests category, a functional tests category, a load tests category, and any other suitable tests category.

In the example of FIG. 2. instructions 230 may display, in UI 240, a representation of each of the plurality of identified ALM entities belonging to any of the selected categories while target code segment 242 is at least partially in focus in UI 240. In such examples, instructions 230 may display representations of ALM entities of different categories in different areas of UI 240. In some examples, instructions 230 may also display representation(s) of the similar other code in an area of UI 240 different from the area in which the ALM entity representations are displayed.

In the example of FIG. 2, for example, selection 286 may specify a defect category and a requirement category as the selected categories. In such examples, instructions 230 may display a representation of each of the plurality ALM entities identified by the ALM system that belongs to the defect category or the requirement category. For example, as illustrated in FIG. 2, instructions 230 may display representations 253 and 254 in a defect area 252 of insight portion 243 of UI 240, and may display representations 257 and 258 in a requirement area 256 of insight portion 243 of UI 240. In such examples, these representations may be displayed in areas 252 and 256 while target code segment 242 is at least partially in focus in editor portion 241. Also, in some examples, instructions 230 may display representations 245 and 246 of similar other code segments in a similar code area 244 of insight portion 243 of UI 240. In some examples, representations 245 and 246 may be displayed in similar code area 244 while target code segment 242 is displayed in editor portion 241, and while ALM entity representations are displayed in areas 252 and 256.

In examples described herein, to display representations or other information in UI 240, instructions 230 may display the representations or other information as part of UI 240 while IDE 260 displays other aspects of UI 240, or instructions 230 may cause at least one of IDE 260 and any other component(s) of computing device 200 to display the representations of other information in UI 240.

In some examples, instructions 122, 124, 126, 228, 230 and any other instructions of storage medium 120 may be part of an installation package that, when installed, may be executed by processing resource 110 to implement the functionalities described herein in relation to instructions 122, 124, 126, 228, and 230. In such examples, storage medium 120 may be a portable medium, such as a CD, DVD, or flash drive, or a memory maintained by a server from which the installation package can be downloaded and installed. In other examples, instructions 122, 124, 126, 228, and 230 may be part of an application, applications, or component already installed on computing device 200 including processing resource 110. In such examples, the storage medium 120 may include memory such as a hard drive, solid state drive, or the like. In some examples, functionalities described herein in relation to FIG. 2 may be provided in combination with functionalities described herein in relation to any of FIGS. 1 and 3-5.

Figure 3:
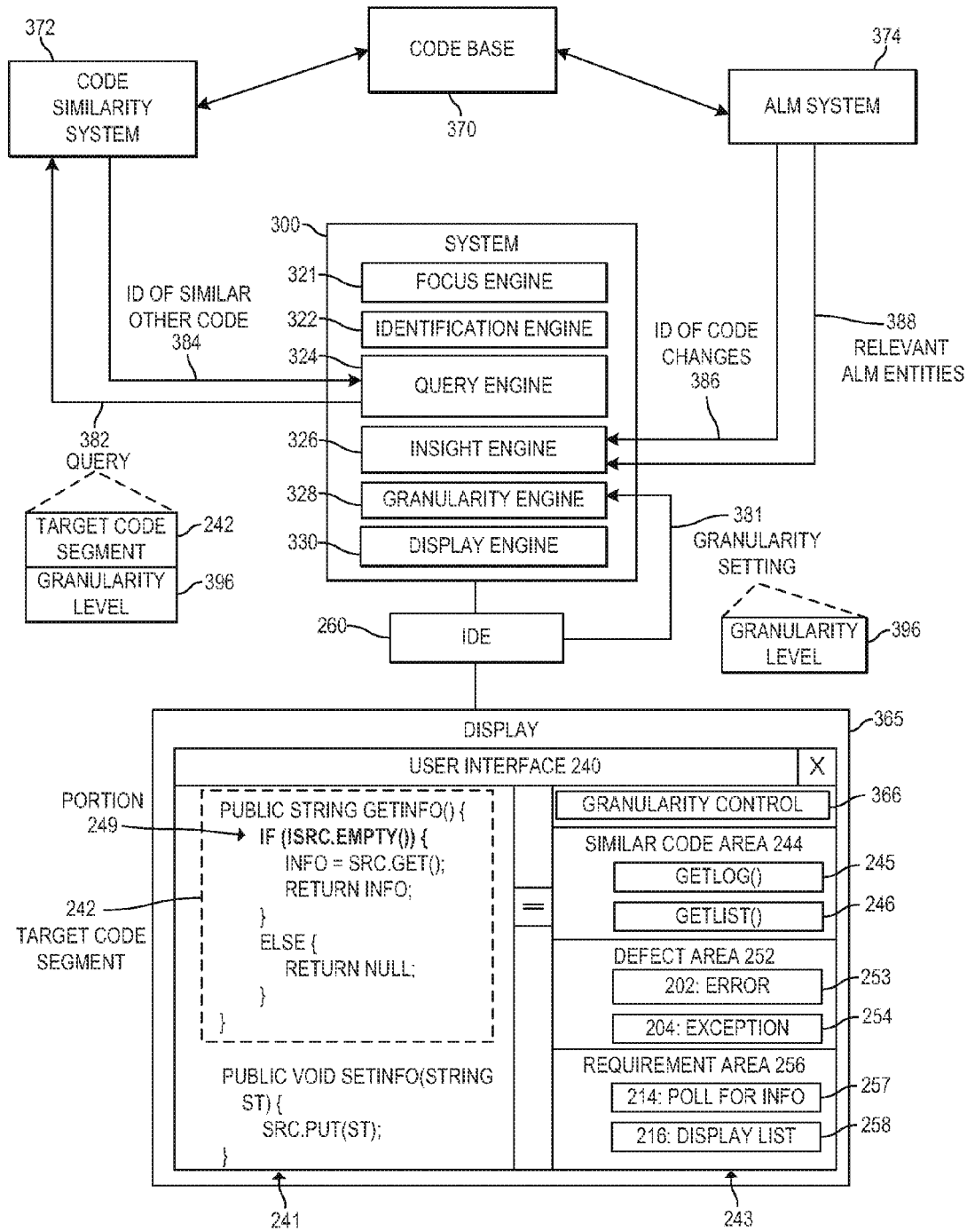
FIG. 3 is a block diagram of an example a system to display, in a user interface (UI) of an integrated development environment (IDE), a representation of an ALM entity associated with code similar to a target code segment at least partially in focus in the UI.

FIG. 3 is a block diagram of an example a system 300 to display, in a UI 240 of an IDE 260, a representation of an ALM entity associated with code similar to a target code segment 242 at least partially in focus in the UI 240.

In the example of FIG. 3, system 300 includes engines 321, 322, 324, 326, 328, and 330. In some examples, system 300 may include additional engines. Each of engines 321, 322, 324, 326, 328, 330 and any other engines of system 300, may be any combination of hardware and programming to implement the functionalities of the respective engine. Such combinations of hardware and programming may be implemented in a number of different ways. For example, the programming may be processor executable instructions stored on a non-transitory machine-readable storage medium and the hardware may include a processing resource to execute those instructions. In such examples, the machine-readable storage medium may store instructions that, when executed by the processing resource, implement system 300. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices.

In some examples, the instructions can he part of an installation package that, when installed, can be executed by the processing resource to implement system 300. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a computing device including the processing resource. In such examples, the machine-readable storage medium may include memory such as a hard drive, solid state drive, or the like.

In the example of FIG. 3, system 300 and an IDE 260, as described above in relation to FIG. 1, may be in communication with one another. System 300 may also be in communication with a display 365. In some examples, system 300, IDE 260, and display 365 may all be components of a computing device. In other examples, display 365 may be part of or in communication with a computing device at least partially implementing each of IDE 260 and system 300.

In the example of FIG. 3, system 300 is also in communication with a code similarity system 372 and an ALM system 374. In such examples, code similarity system 372 may be any suitable code similarity system described above in relation to FIG. 1, and ALM system 374 may be an ALM system as described above in relation to FIG. 1. In some examples, code similarity system 372 and ALM system 374 may each be in communication with a code base 370, in examples described herein, a code base may be any type of code repository stored in any suitable manner on any number of computing devices. For example, a software configuration management (SCM) tool may store code base 370. In such examples, systems 372 and 374 may interact with the SCM to access code base 370. In other examples, code base 370 may be a file system implemented on at least one computing device (e.g., server). In some examples, IDE 260 may also be in communication with code base 370.

In the example of FIG. 3, system 300 may implement at least portions of a plug-in for IDE 260, as described above in relation to plug-in 262. In such examples. IDE 260, together with system 300, may display UI 240, as described above. For example, IDE 260 may display portion(s) of UI 240 (e.g., editor portion 241), while display engine 330 of system 300 displays other portion(s) of UI 240 (e.g., insight portion 243). In other examples. IDE 260 may display UI 240, while receiving input from display engine 330. In such examples, input from display engine 330 may affect what IDE 260 displays in UI 240. For example, display engine 330 may cause IDE 260 to display insight portion 243 as part of UI 240 displayed by IDE 260. In some examples, UI 240 may be displayed on display 365.

In the example of FIG. 3, granularity engine 328 may receive a granularity setting 381 specifying a given granularity level 396. In such examples, given granularity level 396 specified by granularity setting 381 is one of a plurality of code granularity levels. The plurality of code granularity levels may include, for example, at least one of a method level, a class level, a file level, a package level, and any other suitable level. In the example of FIG. 3, display engine 330 may display a granularity control 366 in UI 240. In such examples, control 366 may be any suitable UI control (e.g., a slider, menu, button(s), etc.) by which a user may input granularity setting 381. In other examples, the granularity setting may be input to granularity engine 328 in any other suitable manner. In other examples, granularity setting 381 may be set in any suitable manner and retrieved by granularity engine 328.

In the example of FIG. 3, focus engine 321 may identify a portion 249 of code in focus in UI 240 of IDE 260, as described above in relation to instructions 122 of FIGS. 1 and 2. In some examples, identification engine 322 may identify a target code segment having given granularity level 396 and including the identified portion 249 of code in focus in UI 240. For example, given granularity level 396 specified in granularity setting 381 may be a method level granularity, In such examples, engine 322 may identify, as target code segment 242, the method "GetInfo( )" including the identified portion 249 of code. In other examples, when granularity setting 381 specifies a different granularity level 396, engine 322 may identify a target code segment 242 of a different granularity level including portion 249.

Query engine 324 may query code similarity system 372 for identification 384 of other code similar to target code segment 242 and present in a code base 370. For example, engine 324 may provide a query 382 to code similarity system 372. In such examples, engine 324 may provide, as part of query 382, a copy of target code segment 242 and an indication of given granularity level 396 of target code segment 242. In response, code similarity system 372 may return, to query engine 324, identification 384 of other code similar to target code segment 242. In some examples, the similar other code may comprise other code segments similar to and having the same granularity level as target code segment 242 (i.e., given granularity level 396).

In the example of FIG. 3, for example, engine 324 may provide, to code similarity system 372, a query for code similar to the method "GetInfo( )" (i.e., target code segment 242). In such examples, the query may include a copy of the method "GetInfo( )" and an indication of given granularity level 396, in such examples, code similarity engine 372 may search code base 370 for code segments similar to and having the some granularity level as the method "GetInfo( )". In response, code similarity system 372 may return, to query engine 324, identification 384 of other code segments similar to target code segment 242 and having the same granularity level as target code segment 242. In the example of FIG. 3, code similarity system 372 may identify at least methods "GetLog( )" and "GetList( )". In other examples, additional similar code segment(s) may be identified by system 372. In some examples, system 372 may return the identification 384 of similar other code as part of a list of similar code segments sorted by relevance to target code segment 242.

In some examples, code similarity system 372 may find target code segment 242 when searching for code similar to target code segment 242. In such examples, code similarity system 372 may return an identification of target code segment 242 along with the identification 384 of other segments similar to target code segment 242.

In the example of FIG. 3, insight engine 326 may acquire, from ALM system 374, identification 388 of an ALM entity associated with the similar other code identified by code similarity system 372. In some examples. ALM system 374 may include ALM information for code base 370. In examples described herein, ALM information may be information associated with an aspect of code development and maintained in an ALM system. In some examples, ALM information may be included as part of an ALM entity. For example, an ALM entity related to a defect may include ALM information describing aspects of the defect, such as, for example, a description of the defect, identification of code associated with the defect, and the like. In examples described herein, ALM information for a code base may be ALM information associated with ALM entities linked to code in the code base.

Display engine 330 may display, in UI 240, a representation of the identified ALM entity associated with the identified similar other code while the identified portion of code in focus is displayed in UI 240. In the example of FIG. 3, for example, engine 330 may display a representation 253 of an ALM entity identified by ALM system 374 while the portion 249 of method "GetInfo( )", in focus in editor portion 241 and identified by focus engine 321, is displayed in UI 240. In such examples, the identified portion 249 of code in focus and a representation of an identified ALM entity concurrently may be displayed in UI 240 of IDE 260.

In some examples, insight engine 326 may acquire, from ALM system 374, identification 388 of a plurality of ALM entities associated with the similar other code identified by code similarity system 372. In such examples, display engine 330 may display, in UI 240, a representation of each of the identified ALM entities of the plurality while the identified portion of code in focus is displayed in UI 240. In such examples, the identified portion 249 of code in focus and respective representations of identified ALM entities may be displayed concurrently in UI 240.

In some examples, engine 330 may display representations of ALM entities of selected categories of ALM entities, as described above in relation to FIG. 2. Engine 330 may also display representations of identified ALM entities of different categories in different areas of UI 240, as described above in relation to FIG. 2. In some examples, engine 330 may also display representation(s) of similar other code segment(s) identified by code similarity engine 372, concurrently with representations of identified ALM entities and the identified portion 249 of the code in focus in editor portion 241, as describe above in relation to FIG. 2.

In some examples, insight engine 326 may acquire, from ALM system 374, identification 386 of at least one code change associated with the similar other code identified by code similarity system 372. In such examples, query engine 324 may acquire identification of similar other code segment(s), and insight engine 326 may query ALM system 374 for any code change(s) associated with the similar other code segments. ALM system 374 may provide identification of any code change associated with the similar other code segment(s). In such examples, insight engine 326 may determine which of the code change(s) associated with the identified code change(s) is relevant to target code segment 242. Insight engine 326 may further acquire, from ALM system 374, identification 388 of each relevant ALM entity associated with any code change determined to be relevant to target code segment 242. In such examples, engine 330 may display respective representations of some or all of the identified ALM entities in insight portion 243 of UI 240.

In examples described herein, to display representations or other information in UI 240, engine 330 may display the representations or other information as part of UI 240 while IDE 260 displays others aspects of UI 240, or engine 330 may cause at least one of IDE 260 and any other component(s) of computing device 200 to display the representations or other information in UI 240. In some examples, functionalities described herein in relation to FIG. 3 may be provided in combination with functionalities described herein in relation to any of FIGS. 1-2 and 4-5.

FIG. 4 is a flowchart of an example method 400 for acquiring identification of an ALM entity associated with similar code. Although execution of method 400 is described below with reference to computing device 200 of FIG. 2, other suitable systems for execution of method 400 can be utilized (e.g., computing device 100 or system 300). Additionally, implementation of method 400 is not limited to such examples.

At 405 of method 400, IDE plug-in 262 may identify a target code segment 242 at least partially in focus in a UI 240 of IDE 260. For example, instructions 122 of plug-in 262 may identify target code segment 242, as described above in relation to FIGS. 1 and 2. At 410, plug-in 262 may acquire, from a code similarity system, identification 182 of at least one other code segment similar to target code segment 242. For example, instructions 124 may acquire identification 182 of a plurality of code segments similar to target code segment 242, as described above in relation to FIGS. 1 and 2.

At 415, plug-in 262 may display, in UI 240, a representation of each of the at least one similar other code segments. For example, instructions 230 may display, in UI 240, respective representations (e.g., 245, 246, etc.) of the identified other code segments similar to target code segment 242, while target code segment 242 is at least partially in focus in UI 240, as illustrated in FIG. 2.

At 420, instructions 126 of plug-in 262 may acquire, from an ALM system, identification 184 of an ALM entity associated with the at least one similar other code segment. At 425, instructions 230 of plug-in 262 may display, in UI 240, a representation of the identified ALM entity while target code segment 242 is at least partially in focus in UI 240. In some examples, at 420, instructions 126 may acquire identification 184 of ALM entities associated with any of the similar other code segments identified by the code similarity system. In such examples, instructions 230 may display, in UI 240, respective representations of the identified ALM entities while target code segment 242 is at least partially in focus in UI 240, as illustrated in FIG. 2. In some examples, as illustrated in FIG. 2, instructions 230 may display the representations of the similar other code segments and the representations of the identified ALM entities while target code segment 242 is at least partially in focus in UI 240.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

FIG. 5 is a flowchart of an example method 500 for acquiring identification of an ALM entity associated with a code segment similar to and having the same granularity level as a target code segment. Although execution of method 500 is described below with reference to computing device 200 of FIG. 2, other suitable systems for execution of method 500 can be utilized (e.g., computing device 100 or system 300). Additionally, implementation of method 500 is not limited to such examples.

At 505 of method 500, instructions 122 of IDE plug-in 262 may identify a target code segment 242 at least partially in focus in a UI 240 of IDE 260, as described above. At 510, instructions 124 of plug-in 262 may query a code similarity system for any other code segment similar to and having the same granularity level as target code segment 242, as described above in relation to FIG. 3. At 515, instructions 124 of plug-in 262 may receive identification 182 of at least one similar other code segment from the code similarity system, as described above. At 520, instructions 230 of plug-in 262 may display, in UI 240, a representation of at least some of the identified similar other code segment(s), as described above. In some examples, instructions 230 may display a plurality of similar other code segments identified by the code similarity system as similar to target code segment 242.

At 525, instructions 126 of plug-in 262 may acquire, from an ALM system, identification of at least one code change associated with the similar other code segment(s), as described above in relation to FIG. 3. At 530, instructions 126 of plug-in 262 may determine which of the code change(s) is relevant to target code segment 242. At 535, instructions 126 of plug-in 262 may acquire, from the ALM system, identification of each relevant ALM entity associated with any of the code change(s) determined to be relevant to target code segment 242, as described above in relation to FIG. 3.

At 540, instructions 230 of plug-in 262 may display, in UI 240, a representation of each relevant ALM entity identified by the ALM system, as described above in relation to FIG. 3. In some examples, instructions 230 may display, in UI 240, the representation(s) of the similar other code segment(s) and the representation(s) of the identified relevant ALM entities while target code segment 242 is at least partially in focus in UI 240.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

What is claimed is:

1. A non-transitory machine-readable storage medium encoded with instructions executable by a computing device to:
    identify a target code segment;
    acquire, from a code similarity system, identification of a code segment similar to the target code segment, the identification of the similar code segment based on comparing the target code segment to code segments in a code repository; and
    acquire, from an application lifecycle management (ALM) system, identification of an ALM entity associated with the similar code segment.

2. The non-transitory machine-readable storage medium of claim 1, wherein identifying the target code segment comprises identifying a code segment at least partially in focus in a user interface (UI).

3. The non-transitory machine-readable storage medium of claim 2, wherein the instructions are executable by the computing device to:
   display, in the UI, a representation of the identified ALM entity associated with the similar code segment while the target code segment is at least partially in focus in the UI.

4. The non-transitory machine-readable storage medium of claim 3, wherein:
   the identified ALM entity is one of a plurality of ALM entities associated with the similar code segment; and
   acquiring the identification of the ALM entity comprises acquiring, from the ALM system, identification of each of the plurality of ALM entities; and
   the instructions are executable by the computing device to display, for each respective ALM entity of at least some of the plurality of ALM entities, a representation of the respective ALM entity in the UI while the target code segment is at least partially in focus in the UI.

5. The non-transitory machine-readable storage medium of claim 4, wherein the instructions are executable by the computing device to:
   receive a selection of at least one of a plurality of ALM entity categories;
   wherein displaying the representations of the at least some of the plurality of ALM entities comprises displaying, in the UI, representations of the at least some of the plurality of identified ALM entities belonging to a selected ALM entity category of the plurality of ALM entity categories while the target code segment is at least partially in focus in the UI.

6. The non-transitory machine-readable storage medium of claim 5, wherein the plurality of ALM entity categories include at least one of a defects category, a requirements category, a tests category, a build failures category, or a developers category.

7. The non-transitory machine-readable storage medium of claim 5, wherein the instructions are executable by the computing device to:
   display representations of ALM entities of different ALM entity categories in different areas of the UI.

8. A system comprising:
   a processor; and
   a non-transitory storage medium storing instructions executable to the processor to:
      identify a target code segment having a given granularity level and including a portion of code in focus in a user interface (UI) of an integrated development environment (IDE);
      query a code similarity system for identification of a code segment similar to the target code segment, the identification of the similar code segment based on comparing the target code segment to code segments in a code repository;
      acquire, from an application lifecycle management (ALM) system, identification of an ALM entity associated with the similar code segment; and
      display, in the UI, a representation of the ALM entity associated with the similar code segment while the portion of code is displayed in the UI.

9. The system of claim 8, wherein the instructions are executable on the processor to further:
   identify the portion of code in focus in the UI; and
   receive a granularity setting specifying the given granularity level, wherein the given granularity level is one of a plurality of code granularity levels, the plurality of code granularity levels including at least one of a method level, a class level, or a package level.

10. The system of claim 9, wherein:
    the similar code segment comprises a code segment having the same granularity level as the target code segment; and
    the instructions are executable on the processor to provide, to the code similarity system as part of the query, a copy of the target code segment and the given granularity level.

11. The system of claim 10, wherein:
    the identified ALM entity is one of a plurality of ALM entities associated with the similar code segment; and
    the instructions are executable on the processor to:
       acquire, from the ALM system, identification of each of the plurality of ALM entities; and
       display, in the UI, a representation of each of the plurality of ALM entities while the portion of code is displayed in the UI.

12. A method comprising:
    identifying, with an integrated development environment (IDE) plug-in executed in a computer, a target code segment at least partially in focus in a user interface (UI) of the IDE;
    acquiring, from a code similarity system with the plug-in, identification of a code segment similar to the target code segment, the identification of the similar code segment based on comparing the target code segment to code segments in a code repository;
    displaying, in the UI, a representation of the similar code segment;
    acquiring, from an application lifecycle management (ALM) system with the plug-in, identification of an ALM entity associated with the similar code segment; and
    displaying, in the UI with the plug-in, a representation of the identified ALM entity while the target code segment is at least partially in focus in the UI.

13. The method of claim 12, wherein acquiring the identification of the similar code segment comprises:
    querying the code similarity system for any other code segment similar to and having a same granularity level as the target code segment; and
    receiving the identification of the similar code segment from the code similarity system with the plug-in.

14. The method of claim 13, wherein acquiring the identification of the ALM entity comprises:
    acquiring, from the ALM system, identification of at least one code change associated with the similar code segment;
    determining which of the at least one code change is relevant to the target code segment; and
    acquiring, from the ALM system, identification of each relevant ALM entity associated with any code change determined to be relevant to the target code segment, wherein the identified ALM entity is one of the relevant ALM entities.

15. The method of claim 14, further comprising:
    displaying, in the UI, a representation of each relevant ALM entity.

16. The non-transitory machine-readable storage medium of claim 1, wherein the ALM entity includes information of a defect in the similar code segment.

17. The non-transitory machine-readable storage medium of claim 1, wherein the ALM entity includes information of a test on the similar code segment.

18. The non-transitory machine-readable storage medium of claim 1, wherein the instructions are executable by the computing device to further:
  present the acquired identification of the ALM entity associated with the similar code segment to a developer of the target code segment, to assist the developer in developing the target code segment.

19. The system of claim 8, wherein the ALM entity includes information of a defect in the similar code segment, and the displayed representation of the ALM entity comprises displayed information of the defect.

20. The method of claim 12, wherein the identified ALM entity includes information of a defect in the similar code segment, and the displayed representation of the identified ALM entity comprises displayed information of the defect.

* * * * *